United States Patent
Cantele et al.

(10) Patent No.: US 8,590,152 B2
(45) Date of Patent: Nov. 26, 2013

(54) METHOD FOR MANUFACTURING A MEMBER FOR PURIFYING AUTOMOBILE EXHAUST GAS

(75) Inventors: Cyrille Cantele, Belfort (FR); Gérard Lerdung, Mathay (FR)

(73) Assignee: Faurecia Systemes d'Echappement, Nanterre (FR)

(*) Notice: Subject to any disclaimer, the term of this patent is extended or adjusted under 35 U.S.C. 154(b) by 440 days.

(21) Appl. No.: 12/933,146

(22) PCT Filed: Mar. 17, 2009

(86) PCT No.: PCT/FR2009/050433
§ 371 (c)(1),
(2), (4) Date: Jan. 6, 2011

(87) PCT Pub. No.: WO2009/122083
PCT Pub. Date: Oct. 8, 2009

(65) Prior Publication Data
US 2011/0099811 A1    May 5, 2011

(30) Foreign Application Priority Data
Mar. 20, 2008    (FR) ...................... 08 51803

(51) Int. Cl.
*B21D 51/16* (2006.01)
(52) U.S. Cl.
USPC ............... 29/890; 29/407.05; 73/863.23
(58) Field of Classification Search
USPC ............... 29/890, 407.05; 210/95
See application file for complete search history.

(56) References Cited

U.S. PATENT DOCUMENTS

| | | | | |
|---|---|---|---|---|
| 5,829,132 A | * | 11/1998 | Sickels et al. | 29/890 |
| 5,866,079 A | * | 2/1999 | Machida et al. | 422/179 |
| 5,943,771 A | * | 8/1999 | Schmitt | 29/890 |
| 6,101,714 A | * | 8/2000 | Schmitt | 29/890 |
| 6,168,645 B1 | * | 1/2001 | Succi et al. | 95/8 |
| 6,299,843 B1 | * | 10/2001 | Locker et al. | 422/179 |
| 6,381,843 B1 | * | 5/2002 | Irie et al. | 29/890 |
| 6,389,693 B1 | * | 5/2002 | Aranda et al. | 29/890 |

(Continued)

FOREIGN PATENT DOCUMENTS

| | | |
|---|---|---|
| GB | 2 441 206 A | 2/2008 |
| WO | 2006/065733 A2 | 6/2006 |
| WO | 2007/115667 A1 | 10/2007 |

OTHER PUBLICATIONS

International Search Report, dated Oct. 15, 2009, from corresponding PCT application.

*Primary Examiner* — David Bryant
*Assistant Examiner* — Ruth G Hidalgo-Hernandez
(74) *Attorney, Agent, or Firm* — Pamela A. Kachur

(57) ABSTRACT

A method for manufacturing a member for purifying exhaust gas for an automobile exhaust line, including an enclosure, an exhaust gas purification unit arranged in the enclosure, and at least one element for supporting the unit. The method includes the following steps:

obtaining a first quantity representative of a mass (Mb) of the exhaust gas purification unit;

using at least the first quantity obtained, determining an installation density ($d_{mounted}$) of the or each support element;

determining at least one diameter (Denclosure) of the enclosure as a function of the determined installation density ($d_{mounted}$);

assembling the enclosure, the support element(s) and the gas purification unit, so as to obtain the diameter that was determined for the enclosure and the installation density ($d_{mounted}$) that was determined for the support element(s).

17 Claims, 3 Drawing Sheets

(56) References Cited

U.S. PATENT DOCUMENTS

| | | | |
|---|---|---|---|
| 6,484,397 B1 * | 11/2002 | Collins et al. | 29/890 |
| 6,501,042 B2 * | 12/2002 | Alte et al. | 219/121.46 |
| 6,532,659 B1 * | 3/2003 | DeSousa et al. | 29/890 |
| 6,591,497 B2 * | 7/2003 | Foster et al. | 29/890 |
| 6,769,281 B2 * | 8/2004 | Irie et al. | 72/121 |
| 2004/0213707 A1 * | 10/2004 | Prommersberger et al. | 422/180 |
| 2006/0045824 A1 * | 3/2006 | Foster et al. | 422/179 |
| 2006/0150382 A1 * | 7/2006 | Martin | 29/281.3 |
| 2006/0156794 A1 * | 7/2006 | Horn et al. | 73/32 R |
| 2006/0272153 A1 * | 12/2006 | Bowman et al. | 29/890 |
| 2007/0014707 A1 * | 1/2007 | Schultz et al. | 422/179 |
| 2007/0077190 A1 * | 4/2007 | Ohno | 423/345 |

* cited by examiner

METHOD FOR MANUFACTURING A MEMBER FOR PURIFYING AUTOMOBILE EXHAUST GAS

TECHNICAL FIELD

The present invention generally concerns methods for manufacturing members for purifying automobile exhaust gas.

More specifically, the invention concerns a method for manufacturing a member for purifying exhaust gas for an automobile exhaust line. A purification member comprises a substantially cylindrical enclosure defining a circulation channel for the exhaust gas, a substantially cylindrical exhaust gas purification unit arranged in the enclosure, and at least one element for supporting the exhaust gas purification unit. The exhaust gas purification unit has a side wall turned toward the enclosure and defines an annular space with the enclosure, the at least one support element being inserted into the annular space between the enclosure and the side wall of the exhaust gas purification unit.

BACKGROUND

U.S. Pat. No. 6,389,693 describes a manufacturing method comprising a step for measuring the diameter of the gas purification unit, a step for measuring the mass of the support element, and a step for calculating the diameter of the enclosure as a function of the measurements done.

In certain purification members obtained using this method, the exhaust gas purification unit is not completely supported inside the enclosure.

In this context, the invention aims to propose a manufacturing method that is even more precise.

SUMMARY

A method for manufacturing a purification member of the aforementioned type comprises the following steps:
  obtaining a first quantity representative of a mass of the exhaust gas purification unit;
  using at least the first quantity obtained, determining an installation density of the at least one support element in the annular space;
  determining at least one diameter of the enclosure as a function of the determined installation density; and
  assembling the enclosure, the support element(s) and the gas purification unit to obtain the diameter that was determined for the enclosure and the installation density that was determined for the support element(s).

The method can also include one or several of the features below, considered individually or according to all technically possible combinations.

The installation density ($d_{mounted}$) is determined by calculating a stress (F) applied to the gas purification unit from the first quantity obtained and determining the installation density ($d_{mounted}$) from the calculated stress (F).

The installation density ($d_{mounted}$) is determined from the stress (F) calculated using predetermined mappings.

The method also comprises a step for obtaining a third quantity (Db) representative of the diameter of the gas purification unit, the diameter of the enclosure (Denclosure) also being determined as a function of the third obtained quantity (Db).

The method also comprises the following steps:
  obtaining a second quantity representative of the mass (Mn) of the or each support element;
  using the second quantity (Mn), determining the initial surface density (MSin) of the or each support element before installation;
  determining a thickness value (e) of the annular space as a function of the determined surface density (MSin);
  the diameter (Denclosure) of the enclosure also being determined as a function of the determined thickness value (e).

The thickness value (e) is calculated as a function of the ratio between the determined surface density (MSin) and the determined installation density ($d_{mounted}$).

The enclosure, the support element(s) and the exhaust gas purification unit are assembled using the following steps:
  arranging the support element(s) around the exhaust gas purification unit;
  inserting the support element(s) and the exhaust gas purification unit into the enclosure, so as to obtain a provisional diameter of the enclosure larger than the determined diameter (Denclosure) and a provisional installation density for the support element(s) lower than the determined installation density ($d_{mounted}$),
  reducing the enclosure to the determined diameter (Denclosure), the support element(s) then being at the determined installation density ($d_{mounted}$).

The insertion step is carried out by inserting the support element(s) and the exhaust gas purification unit into the enclosure forcibly, or by rolling the enclosure around the support element(s).

The enclosure, the support element(s) and the exhaust gas purification unit are assembled using the following steps:
  arranging the support element(s) around the gas purification unit;
  inserting the support element(s) and the exhaust gas purification unit into the enclosure, so as to directly obtain the determined diameter (Denclosure) for the enclosure and the determined installation density ($d_{mounted}$) for the support element(s).

The exhaust gas purification unit is a particle filter of a catalytic purification member.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
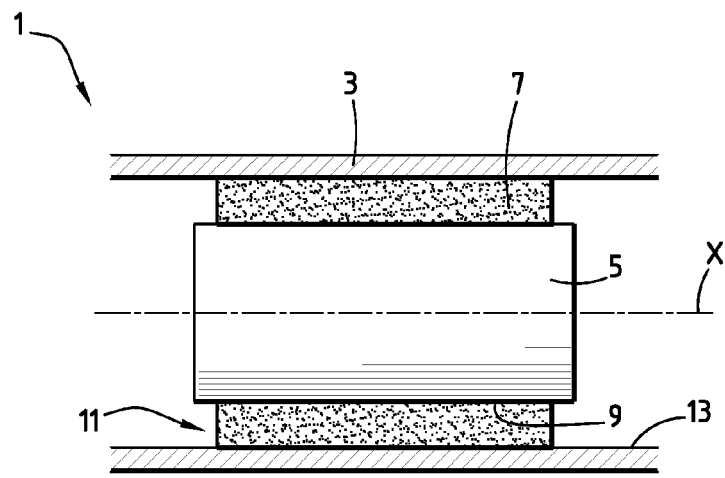
FIG. 1 is a longitudinal cross-sectional view of a purification member manufactured using the method according to the invention.

The exhaust gas purification member 1 illustrated in FIG. 1 is intended to be inserted in an automobile exhaust line (not shown). It includes a substantially cylindrical enclosure 3, a substantially cylindrical exhaust gas purification unit 5 and a supporting lap 7 for the gas purification unit 5. The enclosure 3 is a metal enclosure provided to be connected toward the upstream direction of the exhaust line to a divergent cone defining an exhaust gas inlet, and toward the downstream direction a convergent cone defining an exhaust gas outlet. The inlet is connected to the manifold of the exhaust line, which captures the exhaust gas coming out of the combustion chambers of the engine. The outlet is connected to the cannula through which the exhaust gas is released into the atmosphere after purification.

Upstream and downstream here are used in relation to the normal direction of circulation of the exhaust gas.

The gas purification unit 5 is typically a particle filter or a catalytic purification member. A catalytic purification member is typically made up of a gas-permeable structure covered with catalytic metals favoring oxidation of the combustible gases and/or reduction of the nitrogen oxides.

A particle filter is made of a filtration material made up of a monolithic structure made of ceramic or silicon carbide having sufficient porosity to allow the passage of the exhaust gases. However, as is known in itself, the diameter of the pores is chosen small enough to ensure retention of the particles, and in particular soot particles, on the upstream face of the filter. The particle filter can also be made up of a cartridge filter or a sintered metal filter.

The particle filter used here for example includes a set of parallel ducts distributed into a first group of inlet ducts and a second group of outlet ducts. The inlet and outlet ducts are arranged in staggered rows.

The inlet ducts emerge on the upstream section of the particle filter and are covered at the downstream section of the particle filter.

On the contrary, the outlet channels are covered over the upstream section of the particle filter and emerge on its downstream section.

The enclosure 3 and the gas purification unit 5 are substantially coaxial, this axis being noted X in FIG. 1. The gas purification unit 5 has a reduced diameter in relation to the enclosure 3. It is defined by a side wall 9 turned toward the enclosure 3 and defining an annular space 11 with the enclosure 3.

The support lap 7 is arranged in the annular space 11. It is inserted between an inner face 13 of the enclosure 3 and the side wall 9 of the gas purification unit 5. It extends over the majority of the axial length of the gas purification unit 5.

The enclosure 3 therefore inwardly defines a passage for circulation of the exhaust gas from the inlet to the outlet through the gas purification unit 5. The exhaust gases are purified as they pass through the gas purification unit 5.

The support lap 7 is for example made of an intumescent material. The support lap can be of the XPEAV2 type sold by the company UNIFRAX or for example the type sold under the name NEXTEL SAFFIL or 3M, or the type sold under the name CC-MAX or FIBERMAX by the company UNIFRAX.

The support lap 7 bears outwardly on the enclosure 3 and bears inwardly on the gas purification unit 5. It therefore exerts radial pressure on the gas purification unit 5. The support lap 7 contributes to keeping the gas purification unit 5 in position when the latter is subjected to a longitudinal stress parallel to the axis X, and also when the latter is subjected to a radial stress. When the gas purification unit 5 is subjected to a longitudinal stress, the friction between the gas purification unit 5 and the support lap 7 and between the support lap 7 and the enclosure 3 are such that the movement of the gas purification unit 5 in relation to the enclosure 3 is very limited.

To obtain this effect, it is necessary to install the support lap 7 in the annular space 11 with a suitable installation density. Installation density refers to the density of the support lap 7 at ambient temperature. This density must not be too low because the gas purification unit 5 would be poorly kept in position in relation to the enclosure 3 under the effect of a longitudinal stress. This would be true in particular at high temperatures, due to the differential expansion between the enclosure 3 and the gas purification unit 5, which leads to an increase in the thickness of the annular space.

The installation density also must not be too high, to avoid damaging the ceramic material unit, in particular in the long term.

The manufacturing method explained below takes these various constraints into account.

The method includes a first phase aiming to determine the diameter of the enclosure 3 of the purification member 1.

Figure 2:
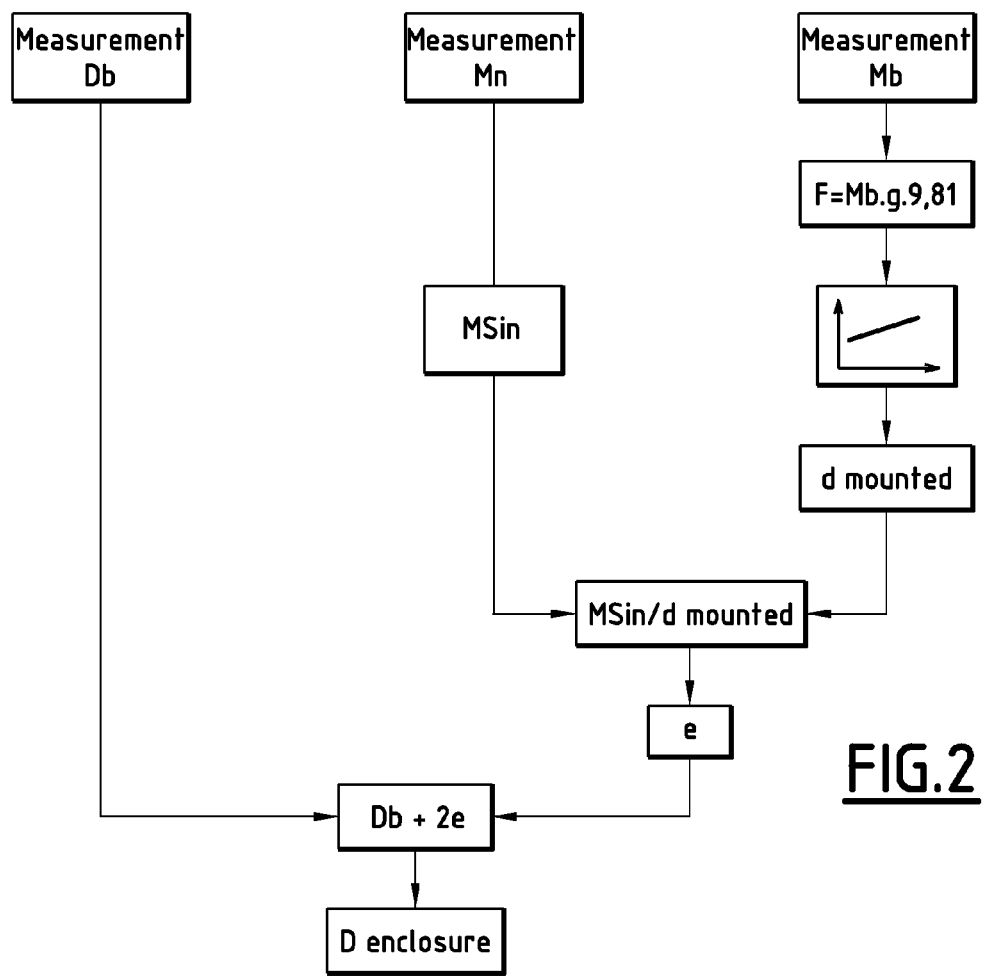
FIG. 2 is a diagram showing the steps of the method according to the invention making it possible to determine the diameter of the enclosure to be manufactured.
Figure 3:
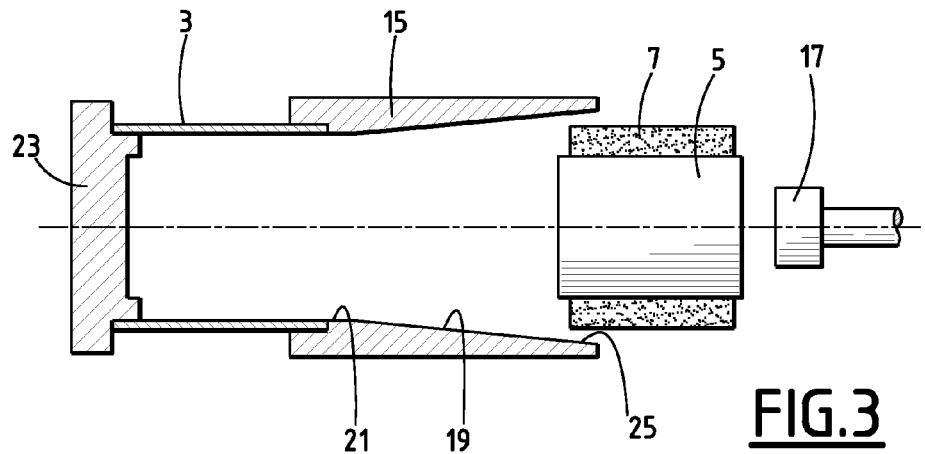
FIGS. 3 to 6 are diagrammatic views illustrating the different steps of assembling the purification member.

As shown in FIG. 2, to that end the method includes a step in which a first quantity Mb representative of the mass of the gas purification unit 5 is obtained, a step during which a second quantity Mn representative of the mass of the support lap 7 is obtained, and a step during which a third quantity Db representative of the diameter of the gas purification unit 5 is obtained.

The diameter Db, for example, corresponds to the average of several exterior diameter measurements, done on different sections of the gas purification unit 5. These sections are, for example, regularly axially spaced along the gas purification unit 5. The quantity Db can also correspond to the maximum of the values noted at different points of the gas purification unit 5. The masses Mb and Mn are for example directly measured using scales.

As shown in FIG. 2, the method includes a step during which the stress F necessary to keep the gas purification unit 5 in position in relation to the enclosure 3 is calculated. A longitudinal stress is considered here. The stress F can be calculated using the following formula:

$$F = Mb \, g \, 9.81$$

where g is the longitudinal acceleration applied to the gas purification unit 5. A predetermined acceleration g is used to calculate F. This acceleration, for example, corresponds to the maximum acceleration undergone by the unit in standard life situations of the vehicle. These life situations are, for example, standing start with strong acceleration, emergency braking, or the impact of the vehicle against an obstacle at moderate speed.

The installation density of the support lap 7 between the gas purification unit 5 and the enclosure 3 is then determined, as a function of the stress F calculated above. The installation density is expressed in lap mass per volume unit of the annular space, at ambient temperature. The installation density $d_{mounted}$ is determined using predetermined mappings. These mappings come from bench and/or road tests of the vehicle. They give the density $d_{mounted}$ as a function of the stress F for different types of laps and different types of units.

The density of the support lap 7 before installation MSin is then determined.

The density of the support lap 7 before installation is a surface density. It is obtained by dividing the mass Mn of the lap by the area of the support lap 7, the area being considered under conditions where the support lap 7 is not compressed or stretched.

The thickness to be provided for the annular space 11 between the side wall 9 of the unit and the inner face 13 of the enclosure 3 is then determined. This thickness is calculated using the following formula:

$$e = MSin / d_{mounted}$$

where e is the thickness expressed in millimeters, MSin is expressed in grams per square meter, and $d_{mounted}$ is expressed in kilograms per cubic meter.

The inner and/or outer diameter of the enclosure is then calculated using the following formulas.

Inner diameter: $D_{enclosure} = Db + 2e$

Outer diameter: $D_{ext} = Db + 2e + 2Ep$ where Ep is the thickness of the enclosure 3. Ep is measured, or is provided by the manufacturer of the enclosure.

During a second phase, illustrated in FIGS. 3 to 6, the enclosure 3, the support lap 7, and the gas purification unit 5 are assembled to obtain the determined diameter for the enclosure 3 and the determined installation density for the support lap 7.

In a first embodiment, an enclosure 3 is supplied with an inner diameter equal to the diameter Denclosure calculated as described above. The support lap 7 is first arranged around the gas purification 5 unit 5. The support lap 7 and the gas purification unit 5 are then jointly inserted into the enclosure 3. For example, the support lap 7 and the gas purification unit 5 are forcibly inserted into the enclosure 3, using a tube sinking 15 and a piston 17. The tube sinking 15 comprises a substantially convergent tapered inner channel 19. The end 21 of the channel 19 having a small diameter has an inner diameter substantially equal to the inner diameter of the enclosure 3. The enclosure 3 is placed next to and in the extension of the end 21. It is locked in relation to the tube sinking 15 by a stop 23.

Figure 4:
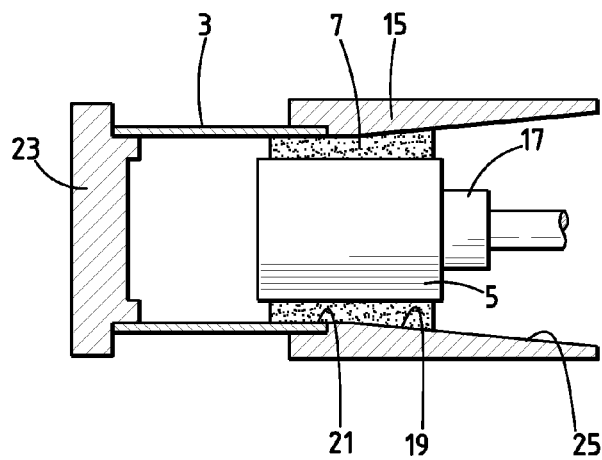
Figure 5:
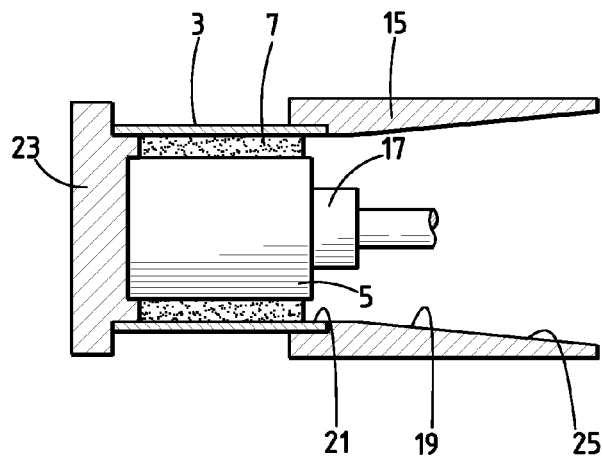

The gas purification unit 5 and the support lap 7 are forced along the inner channel 19 from the end 25 having the larger diameter by the piston 17. The support lap 7 is gradually compressed as the gas purification unit 5 and the support lap 7 move along the inner channel 19 and penetrate the enclosure 3 (FIG. 4). The piston 17 pushes the support lap 7 and the gas purification unit 5 until they are completely housed in the enclosure 3 (FIG. 5). For example, the stop 23 is used to limit the travel of the gas purification unit 5 and the support lap 7 and stop them in the desired position in relation to the enclosure 3.

In another embodiment, an enclosure is supplied that has an inner diameter slightly larger than the diameter Denclosure calculated as described above. This alternative is described in U.S. Pat. No. 6,389,693.

As before, the support lap 7 is first arranged around the gas purification unit 5. The support lap 7 and the gas purification unit 5 are then inserted into the enclosure, for example, using the tube sinking 15 and piston 17, according to the procedure described in reference to FIGS. 3 to 5.

Figure 6:
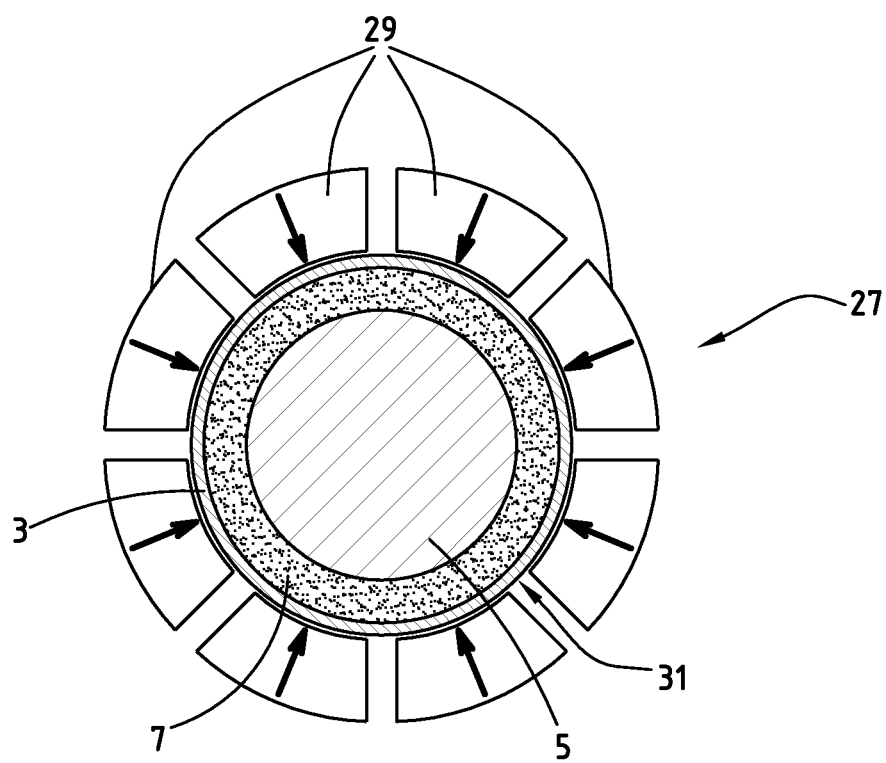

Once the support lap 7 is inserted, it has a provisional installation density lower than the installation density $d_{mounted}$ determined as described above. The enclosure has a provisional inner diameter larger than the diameter Denclosure determined according to the method above. As illustrated in FIG. 6, the enclosure is then reduced to the determined diameter Denclosure, the support lap 7 being compressed at the same time to an installation density corresponding to the value $d_{mounted}$ calculated above.

To that end, the purification member 1 is placed in a cylindrical compression tool 27, as illustrated in FIG. 6. The tool 27 includes a plurality of sectors 29 inwardly defining a cavity 31 in which the purification member 1 is placed. The sectors 29 are distributed circumferentially, around the cavity 31. They are initially separated from each other by circumferential interstices.

The tool 27 also includes a feature for urging the different sectors 29, in a controlled manner, radially toward the inside of the cavity. The sectors 29 then bear on the outer surface of the enclosure 3 and will stress it until the enclosure has the outer diameter $D_{ext}$ calculated above.

The above method has multiple advantages.

Because it comprises the following steps:
obtaining a first quantity representative of a mass of the exhaust gas purification unit;
obtaining a second quantity representative of the mass of the or each support element;
using the first and second obtained quantities, determining an installation density of the at least one support element in the annular space;
determining at least one diameter of the enclosure as a function of the determined installation density;
assembling the enclosure, the support element(s) and the exhaust gas purification unit to obtain the determined diameter for the enclosure and the determined installation density for the support element(s);

the method makes it possible to more precisely manufacture the purification member 1. In particular, the diameter of the enclosure is more precisely dimensioned.

When the manufacturing method takes measurements of the mass of the or each support element, the mass of the gas purification unit and the diameter of the gas purification unit all into account, it makes it possible to dimension the enclosure of the purification member 1 especially precisely. This makes it possible, if applicable, to decrease the thickness of the metal enclosure, and therefore to save material.

This also makes it possible to more accurately dimension the installed density of the support element(s) and thereby increase the longevity of those elements.

In certain cases, the method makes it possible to lower the installation density of the support element(s), and therefore to use elements having a lower mass per surface unit, in the unstressed state.

Moreover, because the installation density of the support element(s) is well controlled, the risks of damaging the gas purification unit over time are reduced.

The insertion of the support elements and the unit inside the enclosure is better mastered, since the diameter of the enclosure is precisely dimensioned. In particular, this makes it possible to limit the amplitude of the reduction necessary to insert the support element(s) and the unit inside the enclosure.

For a ceramic unit with a more complex shape, the method can make it possible to avoid using an erosion seal. In fact, the erosion depends directly on the compression density of the lap. Strong erosion can be seen when the installation density is too low or too high. A better estimate of the installation density therefore makes it possible to distance the system from densities at risk for erosion.

The method described above can have multiple alternatives.

In one non-preferred alternative, only the mass of the gas purification unit is measured, and a predetermined diameter value for the unit and a predetermined mass value per surface unit for the lap are used to determine the diameter of the enclosure.

The lap and the unit are not necessarily inserted into the enclosure using a tube sinking. For example, the enclosure can be rolled around the lap.

In the alternative where it is necessary to reduce the enclosure after insertion of the or each support element and the unit, this operation can be done by passing the assembly formed by the unit, the support element(s) and the enclosure through a tube sinking having a tapered inner channel. This tube sinking is generally of the type illustrated in FIGS. 3 to 5.

The unit is not necessarily kept in place in the enclosure by a lap. The unit can be kept in place by one or several seals, typically two seals placed at the two axial ends of the unit. The seals can be O-rings, placed around the units in the annular space separating the unit from the enclosure.

The seals can also be annular seals with L-shaped sections. Each seal has a wing engaged around the unit in the annular space separating the unit and the enclosure. Each seal also includes another wing pressed on a frontal unit face perpendicular to the axis X. The seals can be made of metal fibers and/or ceramic fibers.

The unit can also be kept in place both by a lap inserted between a central axial section of the unit and the enclosure, and one or several seals as described above, inserted between the axial ends of the units and the enclosure.

The invention claimed is:

1. A method for manufacturing a member for purifying exhaust gas for an automobile exhaust line, the purification member comprising a substantially cylindrical enclosure defining a circulation channel for the exhaust gas, a substantially cylindrical exhaust gas purification unit arranged in the enclosure, and at least one support element that supports the exhaust gas purification unit, the exhaust gas purification unit having a side wall turned toward the enclosure and defining an annular space with the enclosure, the at least one support element being inserted into the annular space between the enclosure and the side wall of the exhaust gas purification unit, the method comprising the following steps:
obtaining a first quantity representative of a mass of the exhaust gas purification unit;
using at least the first quantity obtained to determine an installation density of the at least one support element in the annular space;
determining at least one diameter of the enclosure as a function of the determined installation density; and
assembling the enclosure, the at least one support element and the gas purification unit to obtain the diameter that was determined for the enclosure and the installation density that was determined for the at least one support element.

2. The method according to claim 1, wherein the installation density is determined by calculating a stress applied to the gas purification unit from the first quantity obtained and determining the installation density from the calculated stress.

3. The method according to claim 2, wherein the installation density is determined from the stress calculated using predetermined mappings.

4. The method according to claim 1, including a step for obtaining a third quantity representative of a diameter of the gas purification unit, the diameter of the enclosure also being determined as a function of the obtained third quantity.

5. The method according to claim 1, including the following steps:
obtaining a second quantity representative of the mass of the at least one support element;
using the second quantity, determining the initial surface density of the at least one support element before installation;
determining a thickness value of the annular space as a function of the determined surface density; and
the diameter of the enclosure also being determined as a function of the determined thickness value.

6. The method according to claim 5, wherein the thickness value is calculated as a function of a ratio between the determined surface density and the determined installation density.

7. The method according to claim 1, wherein the enclosure, the at least one support element and the exhaust gas purification unit are assembled using the following steps:
arranging the at least one support element around the exhaust gas purification unit;
inserting the at least one support element and the exhaust gas purification unit into the enclosure to obtain a provisional diameter of the enclosure larger than the determined diameter and a provisional installation density for the at least one support element lower than the determined installation density; and
reducing the enclosure to the determined diameter, the at least one support element then being at the determined installation density.

8. The method according to claim 7, wherein the insertion step is carried out by inserting the at least one support element and the exhaust gas purification unit into the enclosure forcibly, or by rolling the enclosure around the at least one support element.

9. The method according to claim 1, wherein the enclosure, the at least one support element, and the exhaust gas purification unit are assembled using the following steps:
arranging the at least one support element around the gas purification unit; and
inserting the at least one support element and the exhaust gas purification unit into the enclosure to directly obtain the determined diameter for the enclosure and the determined installation density for the at least one support element.

10. The method according to claim 1, wherein the exhaust gas purification unit is a particle filter of a catalytic purification member.

11. The method according to claim 1, wherein the first quantity is obtained by measuring a mass of the exhaust gas purification unit.

12. The method according to claim 1, including a step for obtaining a second quantity representative of a mass of the at least one support element, the installation density of the at least one support element in the annular space being determined using the first and second obtained quantities.

13. The method according to claim 2, including determining the stress based on the mass of the exhaust gas purification unit and a longitudinal acceleration applied to the exhaust gas purification unit.

14. The method according to claim 13, wherein the longitudinal acceleration corresponds to the maximum acceleration undergone by the exhaust gas purification unit during standard operating conditions of a vehicle.

15. The method according to claim 14, wherein the standard operating conditions of a vehicle comprise at least one of a vehicle start condition, an emergency braking condition, and a vehicle impact condition.

16. The method according to claim 2, wherein the installation density is expressed as a support element mass per unit volume of the annular space at ambient temperature.

17. The method according to claim 3, wherein the mappings are based on at least one of road tests and bench tests, and wherein the mappings comprise the installation density as a function of the stress for different types of support elements and different types of exhaust gas purification units.

\* \* \* \* \*